United States Patent
Kalkbrenner et al.

(10) Patent No.: US 11,428,634 B2
(45) Date of Patent: Aug. 30, 2022

(54) METHOD FOR LOCALIZING SIGNAL SOURCES IN LOCALIZATION MICROSCOPY

(71) Applicant: CARL ZEISS MICROSCOPY GMBH, Jena (DE)

(72) Inventors: Thomas Kalkbrenner, Jena (DE); Yauheni Novikau, Apolda (DE); Martin Beck, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 279 days.

(21) Appl. No.: 16/826,058

(22) Filed: Mar. 20, 2020

(65) Prior Publication Data
US 2020/0300765 A1 Sep. 24, 2020

(30) Foreign Application Priority Data
Mar. 22, 2019 (DE) .......................... 102019203923.5

(51) Int. Cl.
*G06V 10/25* (2022.01)
*G06V 10/50* (2022.01)
(Continued)

(52) U.S. Cl.
CPC ......... *G01N 21/6458* (2013.01); *G02B 21/16* (2013.01); *G02B 21/365* (2013.01);
(Continued)

(58) Field of Classification Search
CPC ........ G06V 10/25; G06V 10/50; G06V 10/98; G06V 20/693; G06V 30/12; G06V 20/147;
(Continued)

(56) References Cited

U.S. PATENT DOCUMENTS

| 9,769,399 B2 | 9/2017 | Bewersdorf et al. |
| 2008/0032414 A1 | 2/2008 | Zhuang et al. |
| 2014/0285675 A1* | 9/2014 | Mullis ............... H04N 5/35721 |
| | | 348/173 |

FOREIGN PATENT DOCUMENTS

| EP | 2 076 020 B1 * | 4/2013 | ............. H04N 5/367 |
| WO | 2006127692 A2 | 11/2006 | |
| WO | WO-2011/086227 A1 * | 7/2011 | ........... H04N 5/3656 |

OTHER PUBLICATIONS

Babcock, Hazen, et al., "A high-density 3D localization algorithm for stochastic optical reconstruction microscopy", Optical Nanoscopy; 1:6, 2012, 10 pages.

(Continued)

*Primary Examiner* — Andrew W Johns
(74) *Attorney, Agent, or Firm* — Brake Hughes Bellermann LLP (57) ABSTRACT

The invention relates to a localization microscopy method for localizing signal sources. Here, at least once for each pixel of a detector, values of an error parameter are ascertained and stored in a calibration data record in a manner assigned to the relevant pixel. Captured image data are used to identify regions of origin of signal sources and fit a point spread function to the pixel values of the respective regions of origin. The respective signal source is localized on the basis of the point spread function. The pixel-specific error parameter of each pixel can be compared to a threshold. If the threshold is exceeded, these pixels are either ignored or replaced by means of interpolation when fitting the point spread function. In addition or as an alternative thereto, the real noise performance of the pixels is ascertained and corrected on the basis of derived pixel-specific error parameters.

10 Claims, 5 Drawing Sheets

(51) Int. Cl.
  *G01N 21/64* (2006.01)
  *G02B 21/16* (2006.01)
  *G02B 21/36* (2006.01)
  *G06V 10/98* (2022.01)
  *G06V 20/69* (2022.01)

(52) U.S. Cl.
  CPC .............. *G06V 10/25* (2022.01); *G06V 10/50* (2022.01); *G06V 10/98* (2022.01); *G01N 21/6408* (2013.01); *G01N 2021/6419* (2013.01); *G01N 2021/6421* (2013.01); *G06V 20/693* (2022.01)

(58) Field of Classification Search
  CPC ................ G06V 30/18086; G06K 9/00; G06T 2207/10056; G02B 21/365; H04N 5/365; H04N 5/367; H04N 5/3675
  See application file for complete search history.

(56) References Cited

OTHER PUBLICATIONS

Huang, Fang, et al., "Video-rate nanoscopy using sCMOS camera-specific single molecule localization algorithms", Mature Methods, Jul. 2013, pp. 653-658.

Klein, Teresa, et al., "Eight years of single-molecule localization microscopy", Histochemistry and Cell Biology, 2014, pp. 561-575.

Long, F., et al., "Effects of fixed pattern noise on single molecule localization microscopy", Physical Chemistry Chemical Physics, 2014, pp. 21586-21594.

Wang, Siyuan, et al., "Characterization and development of photoactivatable fluorescent proteins for single-molecule-based super-resolution imaging", PNAS, vol. 111, No. 3, Jun. 10, 2014, pp. 8452-8457.

Wang, Xinyang, et al., "Random Telegraph Signal in CMOS Image Sensor Pixels", Electron Devices Meeting IEDM '06, International IEEE, 2006, 4 pages.

* cited by examiner

METHOD FOR LOCALIZING SIGNAL SOURCES IN LOCALIZATION MICROSCOPY

CROSS REFERENCE TO RELATED APPLICATION

This application claims priority to, under 35 U.S.C. Section 119, and the benefit of, German Application 102019203923.5, filed Mar. 22, 2019, the disclosure of which is incorporated herein by reference in its entirety.

FIELD OF THE INVENTION

The invention relates to a method as per the preamble of the main claim.

BACKGROUND

Various localization microscopy methods are known from the prior art. Prominent examples are methods for localizing individual signal sources, in particular individual emitters, according to the methods referred to by the abbreviations "PALM" (photoactivated localization microscopy; e.g., WO 2006/127692 A2) or "STORM" (stochastical optical reconstruction microscopy; US 2008/0032414 A1). By way of example, an overview of localization microscopy is found in the articles by Klein et al., 2014 (Klein, T. et al., 2014; Eight years of single molecule localization microscopy. Histochemistry and cell biology 141: 561-575) and Babcock et al., 2012 (Babcock, H. et al., 2012; A high-density 3D localization algorithm for stochastical optical reconstruction microscopy. Optical Nanoscopy 1:6).

What is common to the known localization microscopy methods is that they obtain the information for localizing the signal sources (emitter, emitting molecules) from pixel-type 2D areal sensors, which serve as detector or as camera. Very sensitive detectors are required since only several 100 to a few 1000 photons are available per localization step for the localization of individual signal sources such as individual emitting molecules.

By way of example, such sensitive detectors are, e.g., EMCCD (electron multiplying charge-coupled device) sensors. The CCD architecture underlying the EMCCD sensors, with serial readout and gain processes, however, causes limited pixel numbers and/or restricted readout speeds.

The so-called "scientific CMOS" or sCMOS (CMOS=complementary metal oxide sensor) sensors have become established in recent years as an alternative. They unify the "active pixel sensor" architecture, possible as a result of CMOS technology, with very low readout noise and high quantum efficiencies.

The advantages of the sCMOS sensors over conventional EMCCD cameras consist of, e.g., high frame rates, a large pixel number and smaller pixels. Moreover, there is no so-called excess noise since there is no electron multiplication in the sCMOS sensors. Ultimately, this leads to higher effective quantum efficiency. Therefore, the sCMOS sensors lend themselves to the use in localization microscopy as well.

Here, possible inhomogeneities in the signal behavior of the individual pixels are disadvantageous for the accuracy of the localization of individual emitters as radiation sources. While such signal inhomogeneities lead to a disturbed image impression as a worst-case scenario in normal imaging, these may cause a directed incorrect localization during the localization step in localization microscopy. In particular, such inhomogeneities may be due to the already mentioned "active pixel sensor" architecture.

U.S. Pat. No. 9,769,399 B2 and the technical paper by Huang et. al, 2013 (Huang, F. et al., 2013; Video-rate nanoscopy using sCMOS camera-specific single molecule localization algorithms. Nature methods 10: 653-658) describe the use of parameterized models to model the noise performance.

Here, a pixel-dependent noise is modeled as a Gaussian distribution. By way of example, parameters of the modeling are the mean value of the Gaussian distribution (offset), the variance of the distribution and/or the gain per pixel.

By way of example, an offset can be ascertained by virtue of capturing a number of dark images. These dark images can be used to ascertain signals that are generated by the pixel despite the lack of a detection radiation (dark noise; incorrect signals). By way of example, a mean value can be formed from this data and can be used as an error parameter.

The gain can be ascertained by virtue of capturing and evaluating a number of images at different known photon numbers or illumination levels. Proceeding from the captured image data, it is possible to ascertain the distribution function of the pixel values per pixel, in which, for example, use is made of the sum of the photon-induced variance ("shots noise") and Gaussian variance.

However, a disadvantage of such an approach for correcting the noise performance is that individual pixels that deviate significantly from the respective model may lead to significant errors. As an example of such pixels, so-called "blinkers" are specified, which may lead to randomly output signals (Wang, X. et al. 2006; Random telegraph signals in CMOS image sensor pixels. Electron Devices Meeting; IEDM '06, International IEEE 2006).

SUMMARY

The invention is based on the object of proposing a localization microscopy method for localizing signal sources, by means of which the disadvantages occurring in the prior art are reduced.

The object is achieved by a localization microscopy method for localizing signal sources, in which, at least once for each pixel of a detector used for capturing detection radiation, values of a pixel-specific error parameter are ascertained and are stored in a calibration data record in a manner assigned to the relevant pixel. Image data of a sample are captured pixel-by-pixel as pixel values in an image data record, and regions of origin of signal sources are identified on the basis of the captured image data, said regions of origin comprising a number of pixels. A point spread function, also abbreviated PSF below, is fitted to the pixel values of the pixels of the respective regions of origin. The respective signal source is localized, i.e., the point of origin is ascertained in 2D and/or 3D, within the relevant region of origin on the basis of the PSF.

According to the invention, within the calibration data record and for each pixel, the pixel-specific error parameter is compared to a threshold set in advance. Each pixel with a value of the pixel-specific error parameter that is greater than the threshold is marked in the calibration data record. When fitting the PSF to the pixel values of the respective region of origin, all or some of the marked pixels in the image data record are either ignored or replaced by means of interpolation.

In addition or as an alternative thereto, a derived pixel-specific error parameter, instead of the pixel-specific error parameter, can be ascertained in a method for each pixel on the basis of the calibration data record and/or an ADU (analog-to-digital unit) histogram of a number of pixel values is created. The PSF is fitted on the basis of the derived error parameter or on the basis of the respective ADU histograms.

A pixel within the meaning of this description is understood to be a detector element of a detector, for example, a detector element of an sCMOS sensor. The detector has a number of detector elements which, in particular, are disposed in a two-dimensional matrix or an array.

The pixel values captured during the calibration measurement are stored in the calibration data record and, optionally, the respective pixel-specific and/or derived pixel-specific error parameters are stored therein in a manner assigned to the respective pixels. The image data record contains the image data in the form of pixel values per pixel, which are captured during an image capture, for example as raw data in a PALM or STORM method. Each calibration data record or data records derived therefrom can be appended to the image data record, for example as metadata. In this way, a pixel marked in the calibration data record, for example, can also be marked in the image data record.

An interpolation of pixel values of the image data record can be implemented using known methods, for example, by means of regression methods, estimates and/or the formation of mean values or medians.

A pixel-specific error parameter is a signal output by the relevant pixel that arises not on account of captured detection radiation but on account of different influences due to the surroundings and/or due to the components. Due to the surroundings, such incorrect signals may be caused by the temperature of the detector and as a consequence of temperature changes of the detector. Due to the components, incorrect signals may arise, for example, as a result of faulty regions in the semiconductor material of the detector (Wang, X. et al. 2006; Random telegraph signals in CMOS image sensor pixels. Electron Devices Meeting; IEDM '06, International IEEE 2006). An incorrect signal of a pixel transmits the capture of at least one photon even though, in fact, not one photon was captured or fewer photons than required by the sensitivity of the relevant pixel were captured.

Pixel-specific error parameters, which are also referred to as error parameters for short below, are, e.g., the so-called offset, a variance of the pixel values, in particular of a time series, and the gain.

The pixel-specific error parameters that are compared to the threshold may also already have been corrected, for example in respect of their offset and/or gain.

Derived error parameters are quantities derived from captured pixel values. In particular, a Gaussian function can be fitted to the pixel values of a pixel in one configuration of the method according to the invention. Its width of the Gaussian function, denoted by sigma, can be used as a derived error parameter of the variance. This procedure is advantageous over the prior art in which the variance of a pixel is ascertained under the assumption of a Poisson distribution. A variance deviating from the Poisson distribution may have very different physical causes, which are not known in the individual case; this is why the distribution function may not necessarily be described analytically either. Nevertheless, the width of the distribution function can be approximated under the assumption of a Gaussian function and therefore supplies a better reproduction of the noise performance for those pixels that deviate from a Poisson behavior. Variances ascertained thus can likewise be compared to a threshold. Pixels whose variances exceed the threshold are marked and, subsequently, are replaced by means of an interpolation using the image data record or entirely ignored.

Emitting molecules (emitters), whose two-dimensional or three-dimensional position is referred to as point of origin, may act as signal source. The point of origin is ascertained within a region of origin by means of the PSF. In localization microscopy, a PSF typically has an extent (full width at half maximum) of at least 9 (3×3) to 16 (e.g., 4×4) or 25 (5×5) pixels.

The core of the invention lies in the improved localization of signal sources. If the pixel values whose error parameter exceeds a predetermined threshold are ignored or interpolated, a displacement of the point of origin of the signal source, to be ascertained, in the direction of the pixel with the, e.g., inflated pixel value is effectively counteracted. Moreover, the respective specific signal behavior of a pixel can be used to correct incorrect signals.

According to the invention, two basic steps are carried out in order to achieve an improved consideration of the real noise performance of each individual pixel.

A calibration of each pixel of the detector is carried out in a first step. The calibration can be carried out once or regularly or can be repeated when necessary, for example if the properties of the detector change over its service life. The calibration data is stored in a calibration data record.

The calibration of the detector can be carried out by virtue of, initially, all specific filters of the detector platform (=camera) that reduce or suppress unwanted noise and/or blinking for the normal imaging use of the detector being deactivated. The same applies to reduction or suppression of incorrect signals from so-called hot pixels, i.e., pixels that permanently emit an incorrect signal. Subsequently, a number of dark images can be recorded, and error parameters and calibration data can be ascertained for each pixel on the basis of the pixel values of said dark images.

In the second step, the calibration data are used to take account of the pixel-specific noise performance, to correct the respective pixel values of the image data record and to avoid or at least reduce the disadvantages known from the prior art. Here, the calibration data of the calibration data record are appended to image data records of performed measurements, for example according to the PALM or dSTORM method, or provided differently. By way of example, instead of the calibration data themselves, a link to the stored calibration data is written to the metadata.

In one configuration of the method, the fact that, within the scope of localization microscopy, only a restricted number of photons are available in each case per signal source is particularly taken into account. Therefore, there are limits to the accuracy of the localization, even in the case of a detector with ideal noise performance.

Therefore, the number of incorrect signals each pixel would contribute during subsequent localization on account of its individual noise performance is ascertained for each pixel of the detector in the first step of the method. The photon number and, as a result, the accuracy of the localization to be expected in a planned experiment is subsequently ascertained. A tolerable inaccuracy of the localization is set preceding therefrom. The tolerance threshold set thus serves as the threshold.

As thresholds, it is possible to set values that should not be exceeded by the variances of the pixel values of the pixels, in particular the variances of the pixel values of a time series, or the values of an offset of the pixel values.

Pixels whose pixel values of the calibration data exceed the threshold during the calibration are marked in the calibration data record. Since the calibration data record is assigned to the image data record, in particular, appended to the latter, the appropriate corresponding pixels of the image data record are also marked. Then, in the step of localization, marked pixel values can be interpolated and replaced, for example using the pixel values of adjacent pixels of the image data record.

Alternatively, the pixel values of the marked pixels can be ignored.

The threshold can be set in general or individually for each experiment. For setting in general, use can be made, for example, of a fluorophore to be used which emits the fewest number of photons (e.g., tdEOS for a use with PALM; Wang et al. 2014; Characterization and development of photoactivatable fluorescent proteins for single-molecule-based superresolution imaging. PNAS 111: 8452-8457).

If the threshold is set for individual experiments or for groups of experiments, the distribution of the marked pixels may possibly change as a result.

In addition, or as an alternative thereto, the threshold can be set on the basis of wavelengths of an expected or known detection radiation, an intensity of the detection radiation and/or a temperature of the detector.

So as not to have a negative influence of the accuracy of the localization as a result of a multiplicity of marked pixels, the admissible number of marked pixels per region of origin is restricted, either in absolute terms or on average, to a maximum number in an advantageous configuration of the method. By way of example, at most two pixels, preferably at most one pixel, per region of origin are admissible.

If the admissible maximum number is exceeded, the relevant detector is not used or the localization data of this region of origin are provided with a warning. Image data of this region of origin and/or the localization data can still be used, but the use in subsequent analyses should be implemented with reservations.

The pixel values of the non-marked pixels of the image data record can be corrected using the calibration data record, for example with respect to offset and/or gain.

In accordance with a further configuration of the method, a derived error parameter is ascertained for each pixel the basis of the calibration data record. Here, variances of the pixel values per pixel can be ascertained as derived error parameters. Deviating from the prior art, this is advantageously implemented not under the assumption of a Poisson distribution but under the assumption of a Gaussian distribution (see the explanation above).

A derived error parameter can also be a photon transfer curve, by means of which the gain can be corrected or calibrated. To this end, a number of n images are captured under homogeneous illumination and at different illumination levels (m values) and the mean values Mm and the variance Vm are ascertained for each pixel. The respective photon transfer curve is created on the basis of the parameters Mm and Vm (see also: Long, F. et al, 2014; Effects of fixed pattern noise on single molecule localization microscopy. Physical Chemistry Chemical Physics 16: 21586-21594).

In respect of the quality of the localization, it is advantageous if in a further configuration of the method the measured noise performance of each pixel is respectively ascertained in the form of an ADU histogram or the corresponding data, and stored in retrievable fashion in the calibration data record. To this end, each pixel is assigned a dedicated set of ADU histograms for different illumination levels. Hence, a possibly multidimensional LUT (lookup table) is available for each pixel, on the basis of which an applied localization algorithm is able to read the real noise performance for each pixel on the basis of current local conditions. The calculation of the localization on the basis of the PSF is implemented taking account of the derived error parameter or on the basis of the respective ADU histograms. By way of example, a pixel value of a pixel is captured as a grayscale value, for example. A real or actual grayscale value can be ascertained for the relevant pixel with the aid of the LUT and used for the further proceedings. This procedure allows the real noise performance of a respective pixel to be ascertained still before the step of localization and allows the localization to be carried out on the basis of the real noise performance. Here, this configuration of the method can be applied to all pixels or it is only applied to marked pixels.

In order to ensure efficient processing and in order to obtain a compromise between the resolution—and hence an accurate reproduction of the pixel behavior—and the computational outlay or the scope of the metadata, the data of the respective ADU histograms can be combined in a suitable fashion (binning). Additionally, the ADU histograms can still be smoothed and/or interpolated and/or adapted by functions, and the parameters thereof can be stored.

To a great extent, the derived error parameters represent a real noise performance of the relevant pixels, advantageously allowing improved modeling and more accurate localization. In contrast to the approximation according to, e.g., Huang et. al, 2013 (Huang, F. et al., 2013; Video-rate nanoscopy using sCMOS camera-specific single molecule localization algorithms. Nature methods 10: 653-658), the real noise performance of the pixels is reproduced to the best possible extent. This advantageously opens up the possibility of better exploiting the capability of the detector, for example by comprehensively taking into account noise and blinking effects of the detector, which is hardly possible in methods according to the prior art.

The configurations of the method according to the invention advantageously reduce or avoid disadvantages known from the prior art. Thus, high computing power is required for the calibration of the detector and for a localization according to the prior art. In addition to the measurement and computational outlay for the calibration by means of, e.g., 2.5 million frames (U.S. Pat. No. 9,769,399 B2 and Huang et al. 2013; see above), it is necessary, on the basis of the calibration measurements, to take into account the noise of each pixel as a convolution of shots noise (Poisson distribution) and pixel-dependent noise (Gaussian distribution) in the likelihood function in the "maximum likelihood estimator." Since this must be implemented for every pixel in each localization process, the computational outlay is very high. Therefore, this noise distribution is described by an analytic approximation; however, the latter is only sufficiently accurate for those pixels that behave in accordance with the assumed model. Pixels that deviate significantly from the model cannot be taken into account by adapting the parameterized model and then lead to completely incorrect predictions of the model.

The invention is explained in exemplary fashion on the basis of the characteristics of sCMOS sensors. However, it can also be applied to different types of pixel-based detectors. For example, the above-described problems and effects in principle also apply to CCD sensors and EMCCD sensors, albeit usually to a less pronounced extent.

BRIEF DESCRIPTION OF THE DRAWINGS

The invention is explained in more detail below on the basis of figures and various configurations. In the figures:

FIG. 1B shows an exemplary representation of a histogram of the ascertained PSF widths of the signal sources of FIG. 1a.

DETAILED DESCRIPTION

Figure 1A:
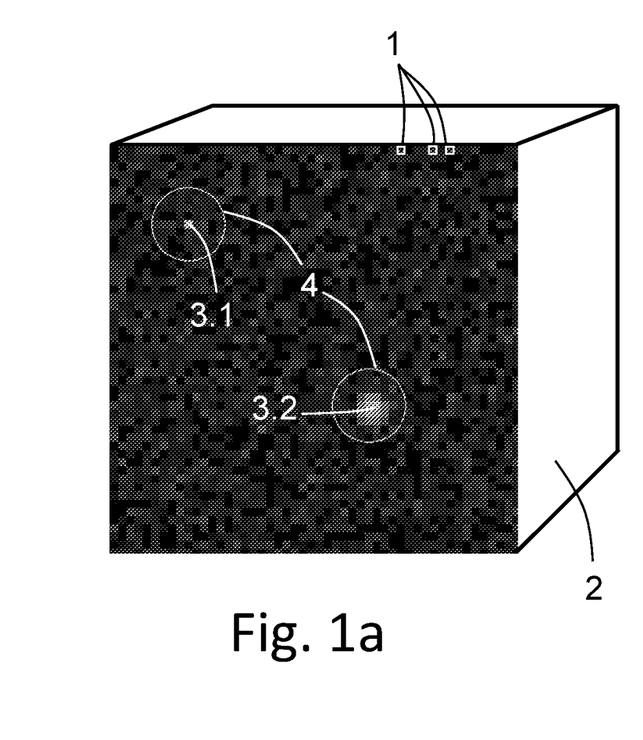
FIG. 1A shows an exemplary representation of captured pixel values with a bad pixel and an emitting molecule as signal sources.

An exemplary representation of a two-dimensional arrangement of pixels 1 of an indicated, perspectively illustrated detector 2, for example, an sCMOS sensor, is provided in FIG. 1a. The different captured grayscale values of the individual pixels 1 (three of which are highlighted by an additional frame) are evident. Two particularly bright pixels 1 are selected as potential signal sources 3.1 and 3.2 and the regions of origin 4 thereof are visualized by means of a circle in each case.

Figure 2:
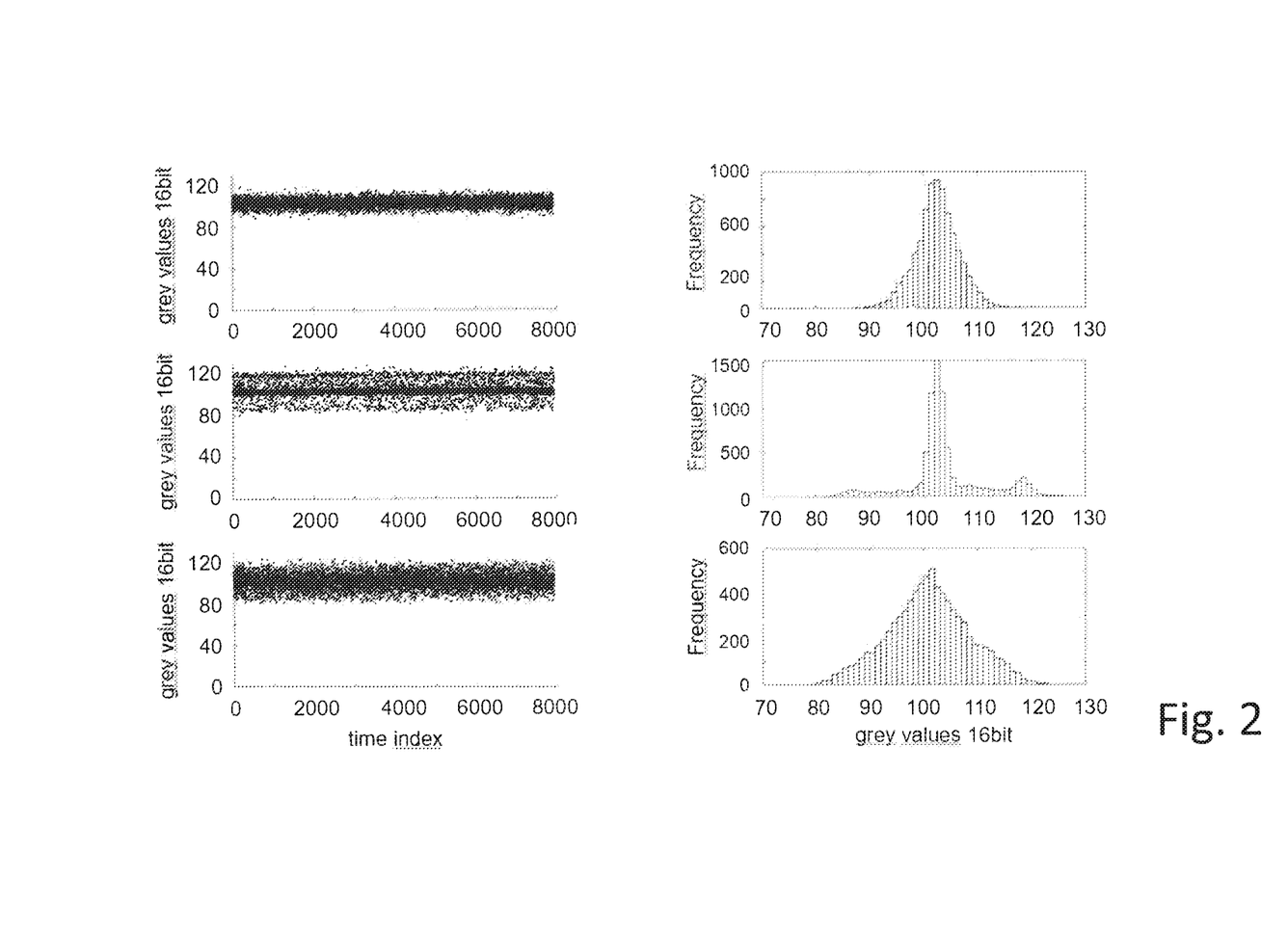
FIG. 2 shows time series of grayscale value distributions of three different pixels of an sCMOS sensor in the case of constant illumination.

FIG. 2 illustrates, in exemplary fashion, the temporal noise performance of three different pixels 1 of an sCMOS sensor in the case of a constant illumination level. The left-hand column plots the grayscale values over time in each case. The right-hand column presents respectively associated histograms of the frequencies of the individual grayscale values.

The first line shows the noise performance of a pixel 1 that is well-described by a model, known from the prior art, of a convolution of a Poisson distribution and Gaussian distribution.

The noise performance illustrated in the last line can only be described unsatisfactorily with a corresponding model on account of its large width and approximately triangular form with a large base width.

The central line presents a noise performance of a pixel 1, whose distribution—as is evident on the right in the associated histogram—cannot be captured by means of the known models.

Figure 3:
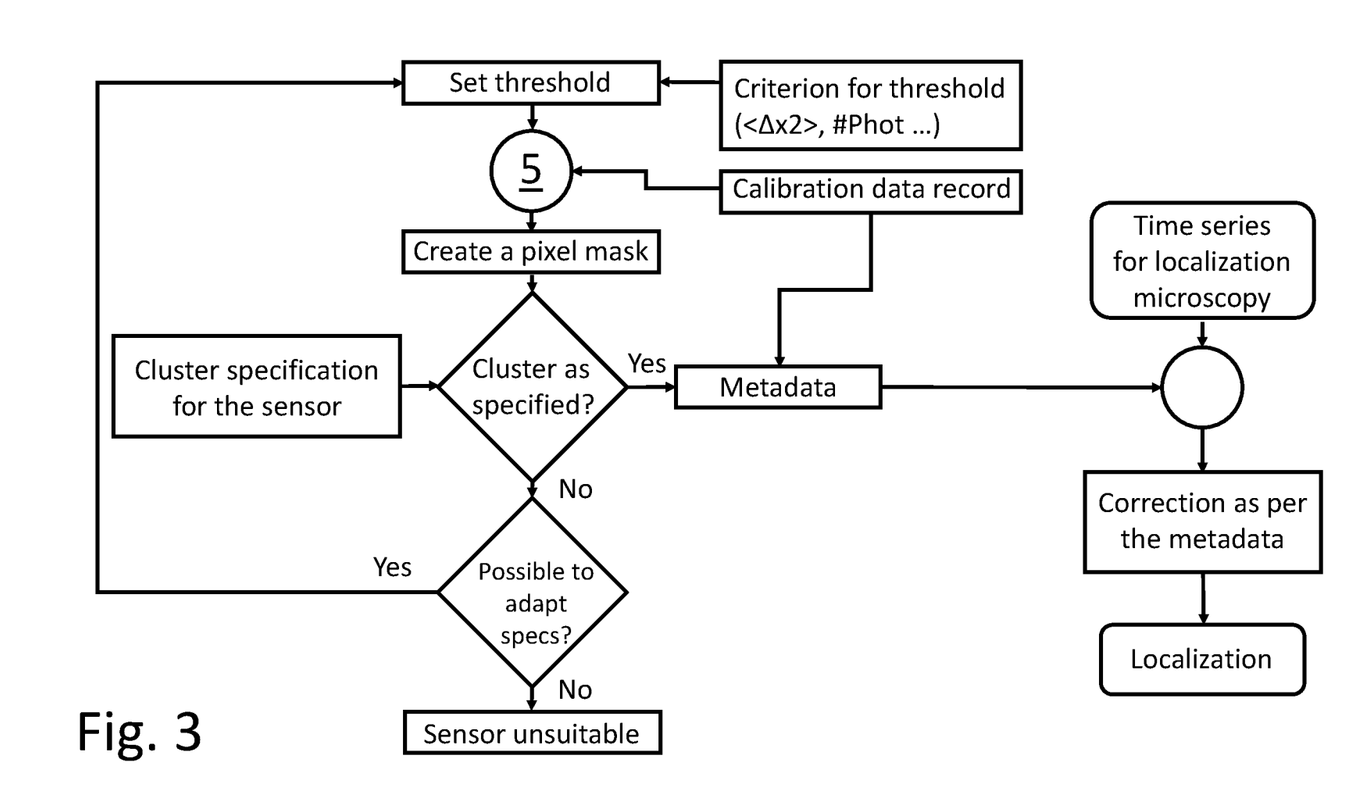
FIG. 3 shows a schematic representation of a method according to the invention using a threshold.

A possible configuration of the method according to the invention using a threshold is presented in FIG. 3 as a sketch. First, a threshold to applied is set. Here, the experiment intended to be performed is taken into account. By way of example, properties of the sample and of the emitters to be used, the illumination wavelengths and illumination level(s) to be used, the detection wavelength(s) and known specifications of the detector and/or of the remaining experimental setup are taken into account.

Proceeding therefrom, the expected localization accuracy and what tolerances should be accepted is ascertained or estimated. The threshold is set in accordance with these deliberations and specifications, and, for example, stored in an evaluation unit 5. By way of example, the threshold is set as an offset or as a variance of the pixel values in order to be able to compare the threshold to the pixel-specific error parameters ascertained from the pixel values.

In an alternative configuration of the method, the threshold can also be ascertained empirically by means of a localization algorithm.

Moreover, a calibration data record is created and stored in a manner assigned to the individual pixels 1 of the detector 2 (see FIG. 1a). To this end, a number of dark images are recorded by the detector 2 and the pixel values of each pixel 1 captured in the process are stored in assigned fashion as a calibration data record. Subsequently, an offset or variance of the pixel values, for example, is ascertained from the pixel values as a pixel-specific error parameter. These can likewise be stored in the calibration data record in a manner assigned to the pixels 1.

The values of the pixel-specific error parameters ascertained thus are compared to the threshold for each pixel 1. If the value of a pixel-specific error parameter exceeds the threshold, the relevant pixel 1 is marked in the calibration data record, for example by virtue of its pixel coordinates (x, y) being listed in the metadata. The marked pixels 1 should not be taken into account for subsequent evaluations and are therefore "masked," i.e., labeled as no longer to be taken into account (pixel mask).

In a further step, a check is carried out as to whether masked pixels 1 are present in clusters. To this end, the maximum admissible clustering is set (specified) in advance and likewise stored. By way of example, how far apart two marked pixels 1 have to be as a minimum so as not to form a cluster is set.

If the conditions of admissible clustering are satisfied, there is a transition to the localization of the signal sources 3.1, 3.2.

By contrast, if the distribution of the masked pixels 1 does not meet the admissible clustering, a check is carried out as to whether admissible clustering can be achieved (cluster specification) by way of modified settings of operational parameters (specs) of the detector 2. If this is not the case, then the detector 2 (=sensor) is unsuitable.

By contrast, if the operational parameters of the detector 2 can be set in such a way that admissible clustering is obtained, these settings are performed and there is a transition to the localization of the signal sources 3.1, 3.2.

By way of example, the calibration data record and the information in respect of the marked pixels 1 (pixel mask) are provided as metadata and appended to an image data record to be created.

For a sample to be evaluated, a time series of image data is captured (time series for localization microscopy) and the pixel values are stored, assigned to the respective pixels 1, as an image data record. Pixel values that are ascertained by means of an interpolation on the basis of the pixel values of adjacent pixels 1 are assigned to the masked pixels 1 or the masked pixels 1 obtain no pixel value and are ignored during subsequent localization of the signal source 3.1, 3.2. Alternatively, the respectively captured pixel values could also be assigned to the marked pixels 1, for example in order to be able to carry out a separate error evaluation. However, for an actual localization, these pixels 1 are ignored or the pixel values thereof used for the localization are previously ascertained by means of interpolation and assigned.

The pixel values of the image data record are corrected on the basis of the calibration data record and, optionally, by taking account of the metadata (correction as per the metadata). Regions of origin 4, in which a signal source 3.1, 3.2 is located, are ascertained within the array of the pixels 1 on the basis of the image data, in particular the pixel values. By way of example, this is implemented on the basis of the maxima of the captured and corrected pixel values. A localization algorithm is applied to the corrected pixel values of the pixels 1 of the respective region of origin and a PSF is fitted. The location of the maximum of the PSF is ascertained and stored as point of origin of the signal source 3.1, 3.2.

Figure 4:
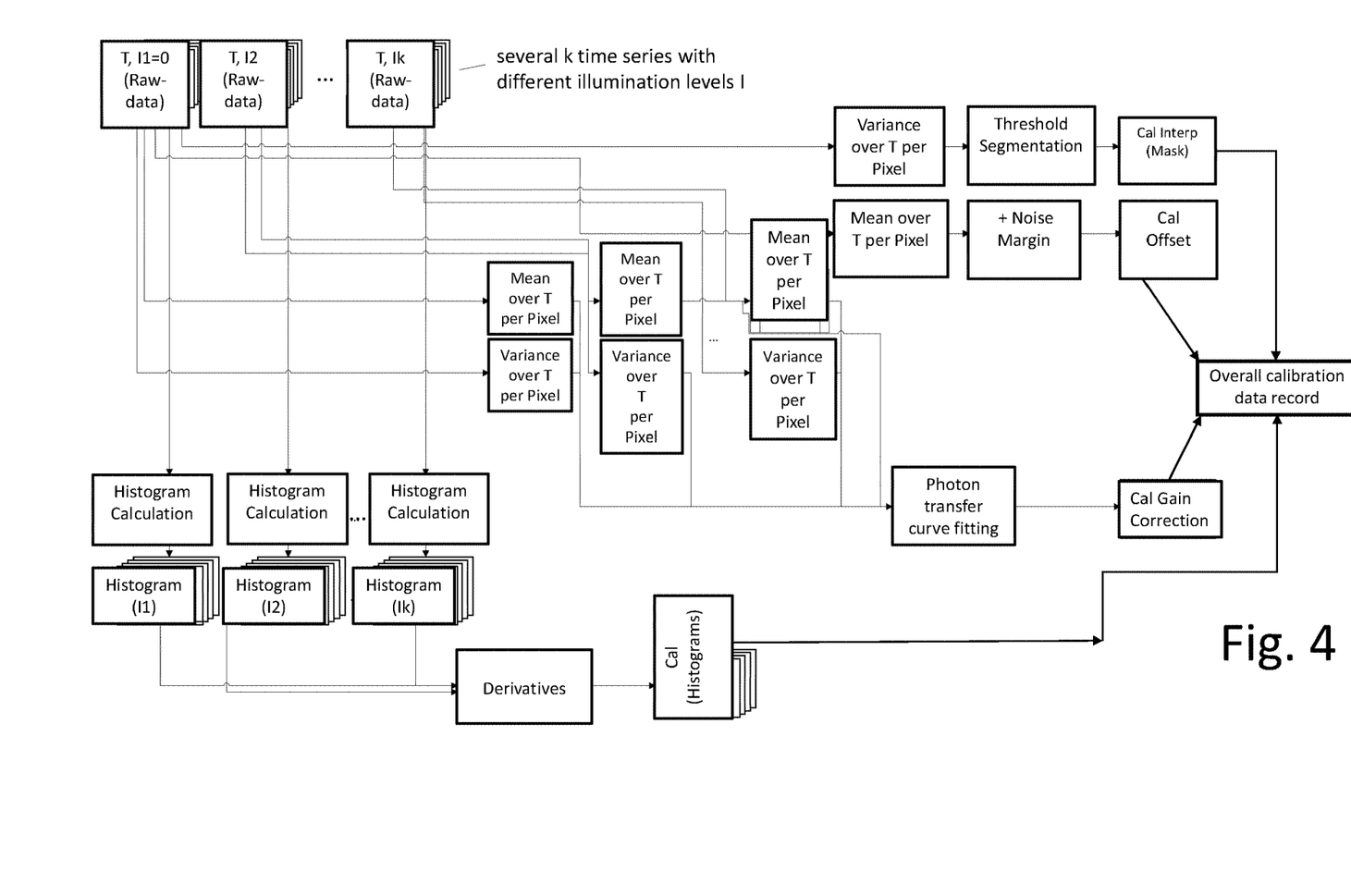
FIG. 4 shows a schematic representation of a calibration of the detector with different possible calibration parameters and a production of a calibration data record.

In exemplary fashion, FIG. 4 illustrates a calibration of the detector with different possible calibration data records and a production of an overall calibration data record. To this end, time series with different illumination levels I1 to Ik are captured. Here, the illumination level I1 equals zero and corresponds to a time series of dark images. The pixel values captured at the illumination level I1 are used to produce a calibration data record [Cal Interp (Mask)] with marked and masked pixels, as was explained in relation to FIG. 3.

Moreover, the pixel values captured at the illumination level I1 can be used to produce a calibration data record (Cal Offset) in which the offset of each pixel 1 is ascertained and stored. The pixel values can be corrected by subtracting the mean value of the pixel values from every pixel value. In order to avoid negative pixel values occurring in the process or, depending on the data format, should negative values be inadmissible (so-called "clipping" at zero), a constant and known value ("NoiseMargin") is optionally added to all pixel values and stored.

Proceeding from the individual time series, it is furthermore possible to ascertain the mean values of the pixel values and the variance s within the time series in each case. The mean values and variances serve to create and fit (photon transfer curve fitting) a photon transfer curve (PTC). The created photon transfer curve is stored in a calibration data record (Cal Gain Correction).

Moreover, ADU histograms [Histogram (I1), Histogram (I2), . . . ; Histogram (Ik)] can be created from the pixel values of the time series in each case and stored. Subsequently, these can optionally be combined in suitable fashion (binning), smoothed, approximated and/or filtered before they are stored as calibration data records[Cal (Histograms)].

The aforementioned calibration data records can be combined to form an overall calibration data record. Alternatively, they can also be produced and/or stored and applied individually.

Figure 5:
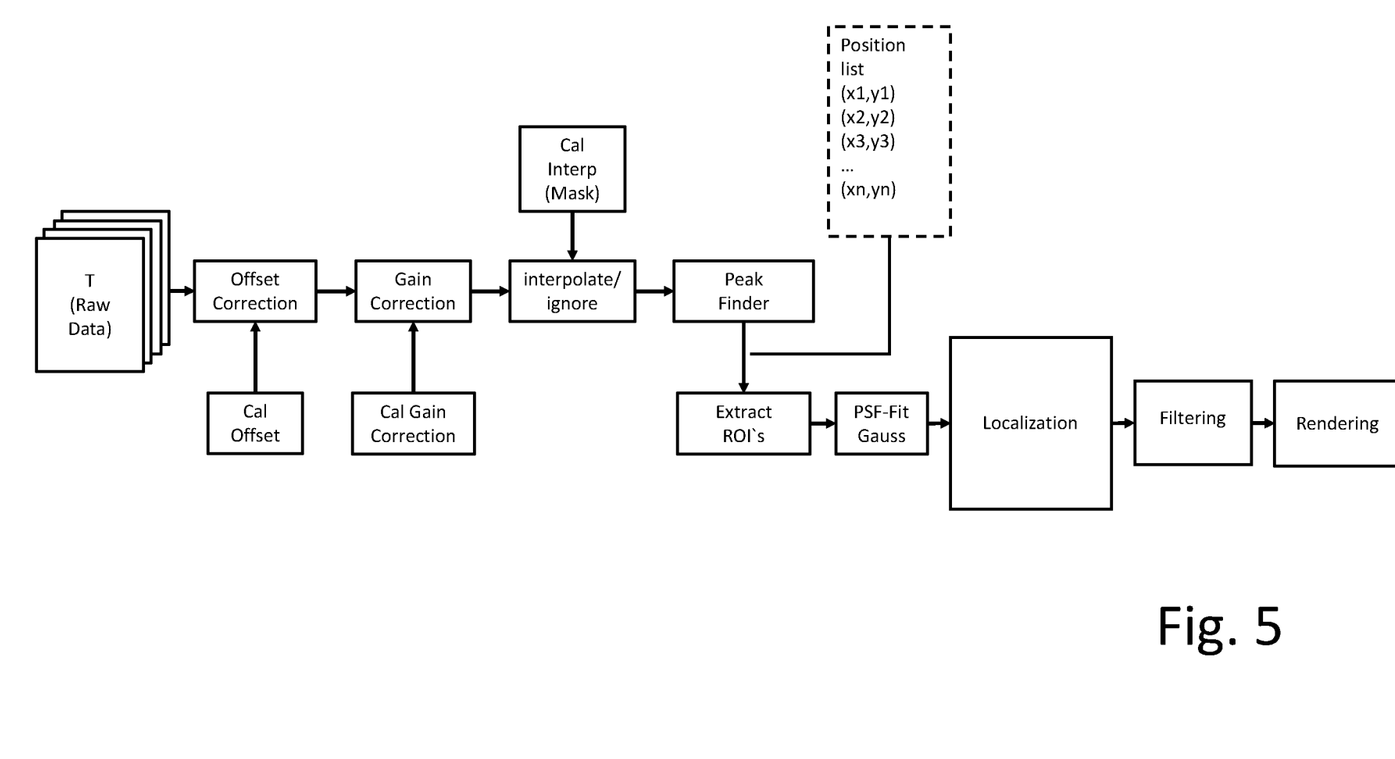
FIG. 5 shows a schematic illustration of an exemplary embodiment of processing pixel values and the calibration data record.

An application of the various calibration data records to captured image data of an image data record is shown in FIG. 5 in exemplary fashion. The image data of the image data record, denoted by T (Raw Data), are corrected by means of the offset calibration data record (Cal Offset) in respect of an offset and by means of the gain calibration data record (Cal Gain Correction) in respect of a photon transfer. The pixel values of the captured image data, corrected thus, are subsequently corrected using the Cal Interp (Mask) calibration data record (masking). As already explained above, the pixels 1 whose variances exceed the threshold set for the Cal Interp (Mask) calibration data record are marked in the Cal Interp (Mask) calibration data record and in the image data record, and are optionally masked.

Possible signal sources (Peak Finder) and associated regions of origin 4 (Extract ROI; ROI=region of interest) are identified on the basis of the corrected pixel values.

The point of origin of the signal source 3.1, 3.2 in the respective region of origin 4 is ascertained by fitting the PSF [PSF-Fit (Gauss)] and the quality of the fit is checked.

Additionally, a filtering step (Filtering) can be carried out following the actual localization (Localization). Using this, it is possible to identify "bad pixels", the grayscale values and noise performances of which do not correspond to those of the emitter used in the experiment. Bad pixels are understood to be hot pixels, blinkers and dead pixels or other types of pixel behavior that leads to apparent photon detection events. Despite the previously applied calibrations and localization steps, such bad pixels may have been identified and localized as regular signal sources 3.1, 3.2, for example as fluorescing molecules.

By way of example, the captured photon number, the signal-to-noise ratio and the blinking behavior can be used as filter parameters. The width of the PSF is also a suitable filter parameter, as the latter is largely independent of the respective experiment.

Particularly the latter filtering is based on the circumstance that the localization of the singulated signal sources requires a spread of the PSF over a plurality of pixels 1, which occurs by way of the effect of the optical design of the system, for example objective lens, tube lens and pixel dimensions. If significantly narrower PSF widths occur at individual pixels 1 localized by the algorithm, which significantly narrower PSF widths for example correspond to a pixel, these can be identified as bad pixels by way of a suitable choice of a filter threshold of the PSF width and can be excluded.

Figure 1B:
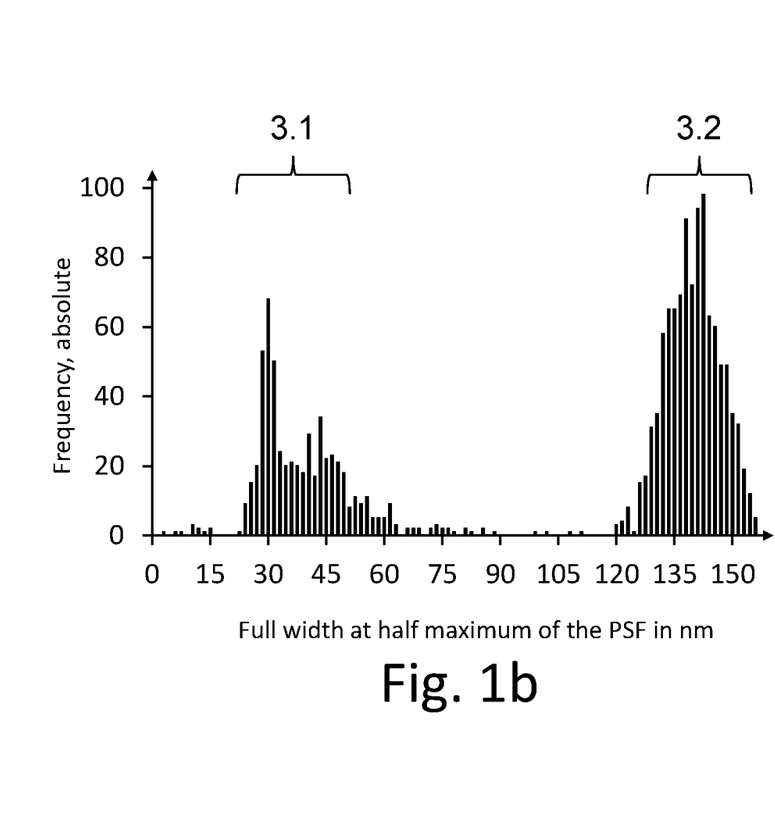

By way of example, two signal sources 3.1 and 3.2 are evident in FIG. 1a, the respective region of origin 4 of which is outlined by a circle. The size of the pixels 1 is 100 nm in the sample. The PSF widths (full width at half maximum, Gaussian fit) of the two signal sources 3.1, 3.2 are shown in FIG. 1b in exemplary fashion for 1000 localizations each of the two signal sources 3.1, 3.2. While the signal source 3.1 situated top left in FIG. 1a has a PSF width of only approximately 40 nm (range: 30-50 nm), the signal source 3.2 situated bottom right in FIG. 1a has a PSF width of approximately 140 nm, as is typical for a fluorophore.

Therefore, the assumption can be made that the left signal source 3.1 is caused by a bad pixel (hot pixel or warm pixel or blinker), while the right signal source 3.2 is in fact a fluorophore.

In principle, this filter function can also be carried out without the aforementioned steps of the method according to the invention.

The invention claimed is:

1. A method for localizing signal sources, the method comprising:

determining, for each pixel of a detector used to capture detection radiation, at least one value of a pixel-specific error parameter;

storing the at least one value for each pixel in a calibration data record;

for each pixel, comparing the pixel's at least one value of the pixel-specific error parameter to a threshold;

marking each pixel having a value of the pixel-specific error parameter that is greater than the threshold in the calibration data record;

capturing image data of a sample pixel-by-pixel with the detector;

storing the image data as pixel values in an image data record;

identifying regions of origin of signal sources in the sample based on the captured image data, wherein the regions of origin correspond to a plurality of pixels;

fitting a point spread function to the pixel values of the respective regions of origin, wherein pixel values of marked pixels are either ignored or replaced by means of an interpolation when fitting the point spread function; and localizing the respective signal sources within relevant regions of origin based on the point spread function.

2. The method according to claim 1, wherein the threshold is set based on wavelengths of a detection radiation, an intensity of the detection radiation and/or a temperature of the detector.

3. The method according to claim 1, wherein, on average, a predetermined maximum number of pixels is marked in each region of origin.

4. The method according to claim 1, further comprising correcting the pixel values of non-marked pixels using the calibration data record.

5. A method for localizing signal sources, the method comprising:
   determining for each pixel of a detector used to capture detection radiation, at least one value of a pixel-specific error parameter;
   storing the at least one value for each pixel in a calibration data record;
   determining a derived error parameter for each pixel based on the calibration data record;
   storing, for each pixel, the pixel's derived error parameter in the calibration data;
   capturing image data of a sample pixel-by-pixel;
   storing the image data as pixel values in an image data record;
   identifying regions of origin of signal sources in the sample based on the captured image data, wherein the regions of origin correspond to a plurality of pixels;
   fitting a point spread function to the pixel values of the respective regions of origin, wherein the fitting is based on the derived error parameter; and
   localizing the respective signal sources within relevant regions of origin based on the point spread function.

6. The method according to claim 5, wherein a variance of the pixel values of a time series, a variance of the pixel values of a time series in a case of respectively different illumination levels and/or mean values of respectively one time series at respectively different illumination levels are ascertained as derived pixel-specific error parameter.

7. The method according to claim 6, further comprising:
   determining a photon transfer curve for each pixel based on the variances of the time series of different illumination levels and the mean values,
   wherein the photon transfer curve is used as the derived pixel-specific error parameter.

8. A method for localizing signal sources, the method comprising:
   determining for each pixel of a detector used to capture detection radiation, at least one value of a pixel-specific error parameter;
   storing the at least one value for each pixel in a calibration data record;
   creating an ADU histogram of a number of pixel values for each pixel based on the calibration data record;
   storing, for each pixel, the pixel's ADU histogram in the calibration data;
   capturing image data of a sample pixel-by-pixel;
   storing the image data as pixel values in an image data record;
   identifying regions of origin of signal sources in the sample based on the captured image data, wherein the regions of origin correspond to a plurality of pixels;
   fitting a point spread function to the pixel values of the respective regions of origin, wherein the fitting is based on the respective ADU histograms for the pixel; and
   localizing the respective signal sources within relevant regions of origin based on the point spread function.

9. The method according to claim 8, wherein a variance of the pixel values of a time series, a variance of the pixel values of a time series in a case of respectively different illumination levels and/or mean values of respectively one time series at respectively different illumination levels are ascertained as derived pixel-specific error parameter.

10. The method according to claim 9, further comprising:
    determining a photon transfer curve for each pixel based on the variances of the time series of different illumination levels and the mean values,
    wherein the photon transfer curve is used as the derived pixel-specific error parameter.

* * * * *